United States Patent
Kim

(10) Patent No.: US 11,060,784 B2
(45) Date of Patent: Jul. 13, 2021

(54) FAN ASSEMBLY AND REFRIGERATOR INCLUDING A FAN ASSEMBLY

(71) Applicant: LG ELECTRONICS INC., Seoul (KR)

(72) Inventor: Chang-Joon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 273 days.

(21) Appl. No.: 16/197,485

(22) Filed: Nov. 21, 2018

(65) Prior Publication Data

US 2019/0162462 A1    May 30, 2019

(30) Foreign Application Priority Data

Nov. 28, 2017    (KR) .................. 10-2017-0161033

(51) Int. Cl.
*F25D 17/06*    (2006.01)
*F04D 29/66*    (2006.01)
(Continued)

(52) U.S. Cl.
CPC ......... *F25D 17/062* (2013.01); *F04D 19/002* (2013.01); *F04D 29/164* (2013.01);
(Continued)

(58) Field of Classification Search
CPC ...... F25D 17/062; F25D 17/06; F25D 23/003; F25D 21/14; F04D 29/646; F04D 29/164;
(Continued)

(56) References Cited

U.S. PATENT DOCUMENTS 5,881,567 A * 3/1999 Junge .................... F25D 23/003
                                                                62/428
6,027,307 A    2/2000 Cho et al.
(Continued)

FOREIGN PATENT DOCUMENTS

JP    2001-349298    12/2001
JP      3092681       3/2003
(Continued)

OTHER PUBLICATIONS

European Search Report issued in Application No. 18208548.0 dated Apr. 15, 2019.
Korean Office Action dated Dec. 13, 2018.

*Primary Examiner* — Emmanuel E Duke
(74) *Attorney, Agent, or Firm* — KED & Associates LLP

(57) ABSTRACT

A fan assembly and a refrigerator including a fan assembly may prevent a backward flow of air via a spoke configured to be in parallel with a direction of a fan outlet flow. The fan assembly may include a fan including a hub and blades, a motor to rotate the hub, an outer housing or housing that accommodates the fan, a support frame or frame including an annular body or frame body provided in and coupled to the housing, a bracket centrally positioned in the frame body that fixes the motor, spokes extending between and coupled to the frame body and the bracket, and anti-vibration members arranged along and fixed to the frame body. The anti-vibration members connect the frame body to the housing. A protrusion protrudes outward from and along an outer circumferential face of the frame body to prevent a backflow of air from the fan.

18 Claims, 12 Drawing Sheets

(51) Int. Cl.

| | |
|---|---|
| *F25D 23/00* | (2006.01) |
| *F25D 21/14* | (2006.01) |
| *F04D 29/64* | (2006.01) |
| *F04D 29/16* | (2006.01) |
| *F04D 19/00* | (2006.01) |
| *F04D 29/32* | (2006.01) |
| *F04D 29/38* | (2006.01) |
| *F04D 29/54* | (2006.01) |
| *F16F 15/126* | (2006.01) |

(52) U.S. Cl.
CPC ......... *F04D 29/325* (2013.01); *F04D 29/384* (2013.01); *F04D 29/54* (2013.01); *F04D 29/646* (2013.01); *F04D 29/668* (2013.01); *F16F 15/126* (2013.01); *F25D 21/14* (2013.01); *F25D 23/003* (2013.01); *F25B 2500/13* (2013.01); *F25D 2317/0681* (2013.01); *F25D 2323/00284* (2013.01)

(58) Field of Classification Search
CPC .... F04D 19/002; F04D 29/325; F04D 29/384; F04D 29/54; F04D 29/668; F16F 15/126; F25B 2500/13

See application file for complete search history.

(56) References Cited

U.S. PATENT DOCUMENTS

| | | | | |
|---|---|---|---|---|
| 6,666,045 | B1* | 12/2003 | Song | F25D 23/003 |
| | | | | 62/441 |
| 2002/0127110 | A1* | 9/2002 | Jung | F04D 29/325 |
| | | | | 416/238 |
| 2009/0211287 | A1* | 8/2009 | Steele | B60H 1/3232 |
| | | | | 62/259.1 |

FOREIGN PATENT DOCUMENTS

| | | | |
|---|---|---|---|
| KR | 10-2007-0102124 | | 10/2007 |
| KR | 10-2010-0041076 | | 4/2010 |
| KR | 20100041076 A | * | 4/2010 |
| KR | 10-2011-0020482 | | 3/2011 |
| WO | WO 2014/056752 | | 4/2014 |

* cited by examiner

FAN ASSEMBLY AND REFRIGERATOR INCLUDING A FAN ASSEMBLY

CROSS-REFERENCE TO RELATED APPLICATION(S)

This application claims priority under 35 U.S.C. § 119 to Korean Patent Application No. 10-2017-0161033 filed on Nov. 28, 2017, whose entire disclosure is hereby incorporated by reference.

BACKGROUND

1. Field

A fan assembly and a refrigerator including a fan assembly is disclosed herein.

2. Background

A refrigerator may store food, food materials, food containers, beverages, and other food products (hereinafter, "food") and may allow stored food to be frozen or refrigerated. The refrigerator may include a refrigerator body or body having a cooling chamber (for example, a refrigerator compartment, a freezer compartment, etc.) defined therein, and a refrigeration cycle system or refrigeration cycle that cools the cooling chamber.

A machine compartment may be defined in a back portion of the refrigerator body. Inside the machine compartment of the refrigerator, a compressor and condenser may be provided, which generate cool air to cool the cooling chamber. A fan orifice or fan assembly may be provided in the machine compartment of the refrigerator and may allow a forced air flow that cools the compressor and The fan assembly may include a fan that circulates air, a motor that rotates the fan, and a frame that surrounds the fan and supports the motor.

The fan assembly may enable the forced air flow to dissipate heat of the refrigeration cycle, especially heat from the condenser, which in turn may reduce a power consumption of the refrigerator.

However, a prior fan assembly may be oriented such that main planes of components, or spokes, that support the motor directly collide with air leaving the fan, or fan air. As a result, an air flow resistance may be increased, which may reduce an air-flow rate of the fan assembly and adversely increase a noise. Furthermore, the prior fan assembly may cause a backflow of fan air leaving the fan through a space defined between the frame and a component inserted for vibration reduction, which may also reduce the air-flow rate. This reduction in the air-flow rate in the fan assembly may lead to decreased heat dissipation of the condenser and the rest of the refrigeration cycle, which may increase the power consumption of the refrigerator.

BRIEF DESCRIPTION OF THE DRAWINGS

Embodiments will be described in detail with reference to the following drawings in which like reference numerals refer to like elements, and wherein.

DETAILED DESCRIPTION

Figure 1:
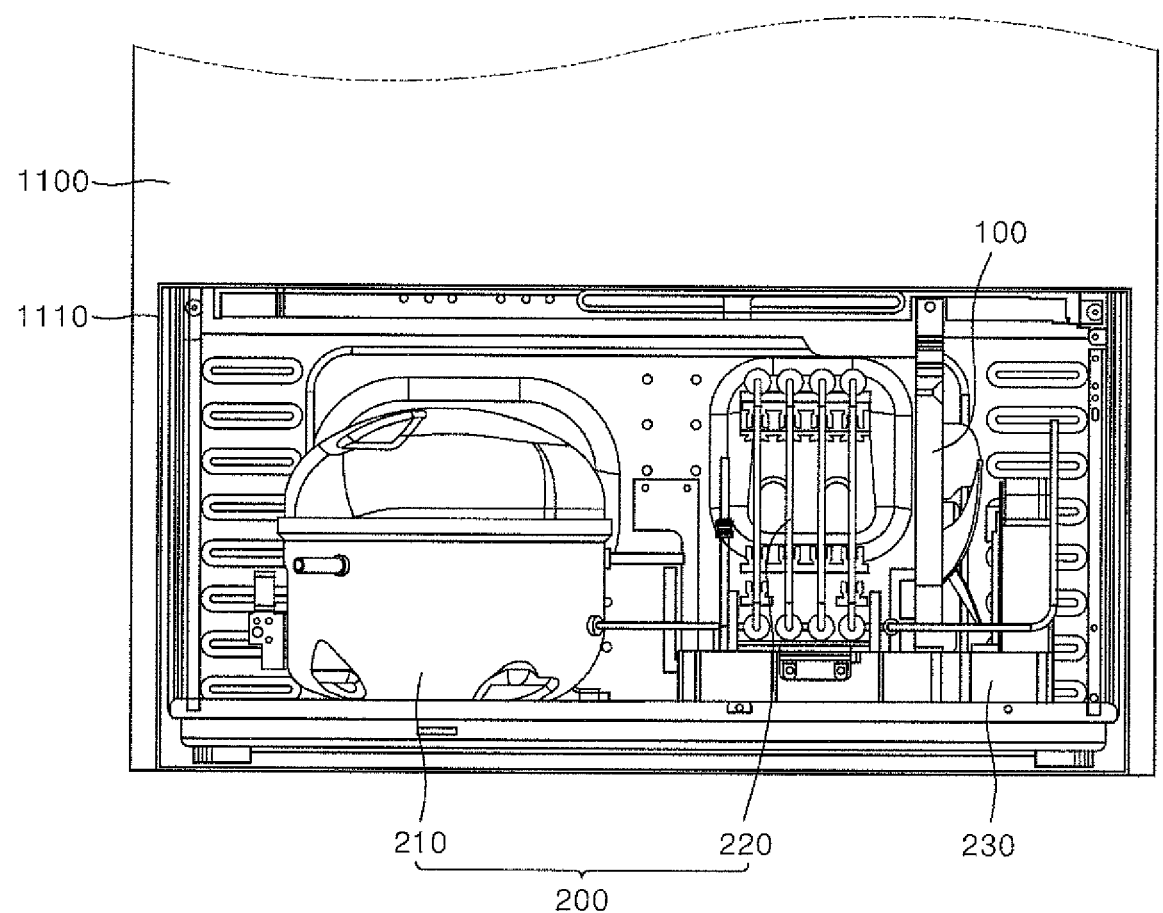
FIG. 1 is a simplified illustration of a machine compartment structure of a refrigerator according to an embodiment.

Referring to FIG. 1, a refrigerator 1000 may store food therein and may allow the stored food to be frozen or refrigerated. The refrigerator 1000 may include a refrigerator body 1100 having at least one cooling chamber (for example, a refrigerator compartment, a freezer compartment, etc.) defined therein. A machine compartment 1110 may be provided in a back portion of the refrigerator body 1100. Inside the machine compartment 1110 of the refrigerator body or body 1100, there may be a refrigeration cycle system, cooling cycle system, or refrigeration cycle 200 that generates cool air to cool the cooling chamber of the body 1100.

The refrigeration cycle 200 may include a compressor 210 that compresses a refrigerant, and a condenser 220 that condenses the refrigerant compressed in the compressor 210. The refrigeration cycle 200 may further include an expander that decompresses and expands the condensed refrigerant, and an evaporator provided near the cooling chamber that may cool via latent heat absorption.

The machine compartment 1110 may be open at a rear face of the refrigerator body 1100. A cover may be detachably coupled to the machine compartment 1110 and may open and/or close an open face of the machine compartment 1110. The cover may have a plurality of holes through which air may pass.

A fan assembly 100 may be provided in the machine compartment 1110 of the refrigerator body 1100. The fan assembly 100 may be spaced away from the compressor 210 and the condenser 220. The fan assembly 100 may force a flow of air to facilitate cooling of the compressor 210 and the condenser 220. The fan assembly 100 may be positioned above a defrosted water tray 230 to increase heat dissipation.

Figure 2:
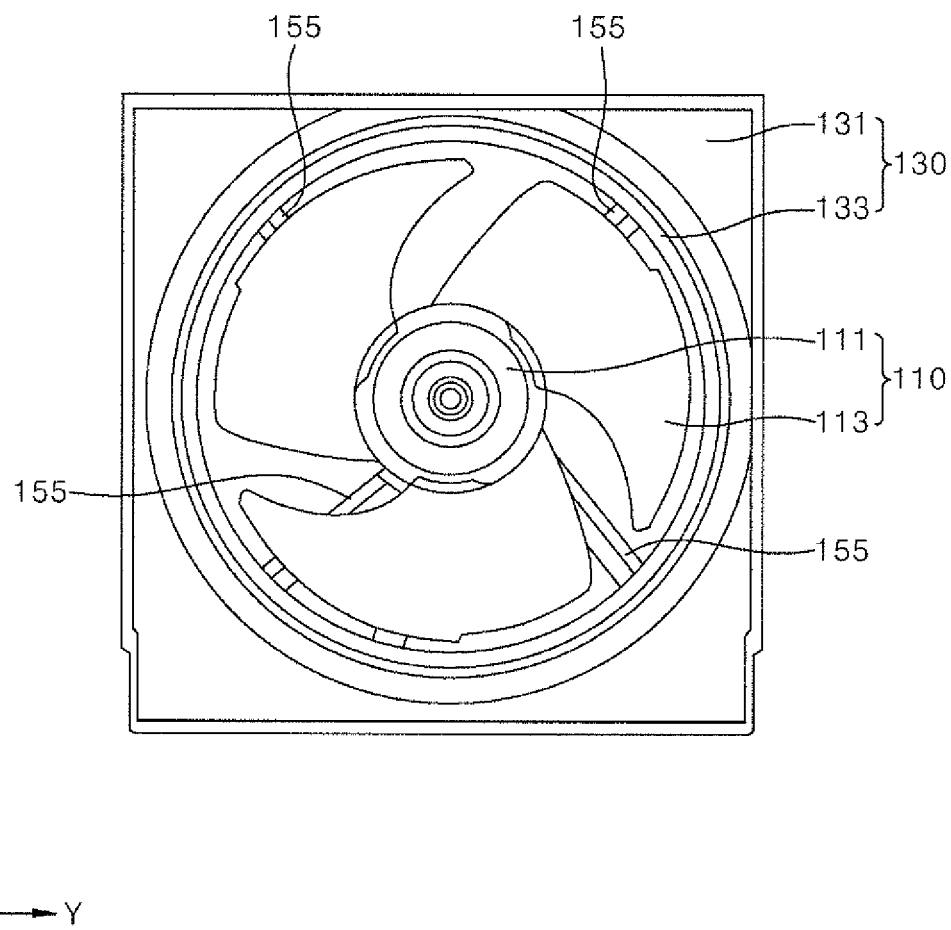
FIG. 2 is a front view of a fan assembly according to an embodiment.
Figure 3:
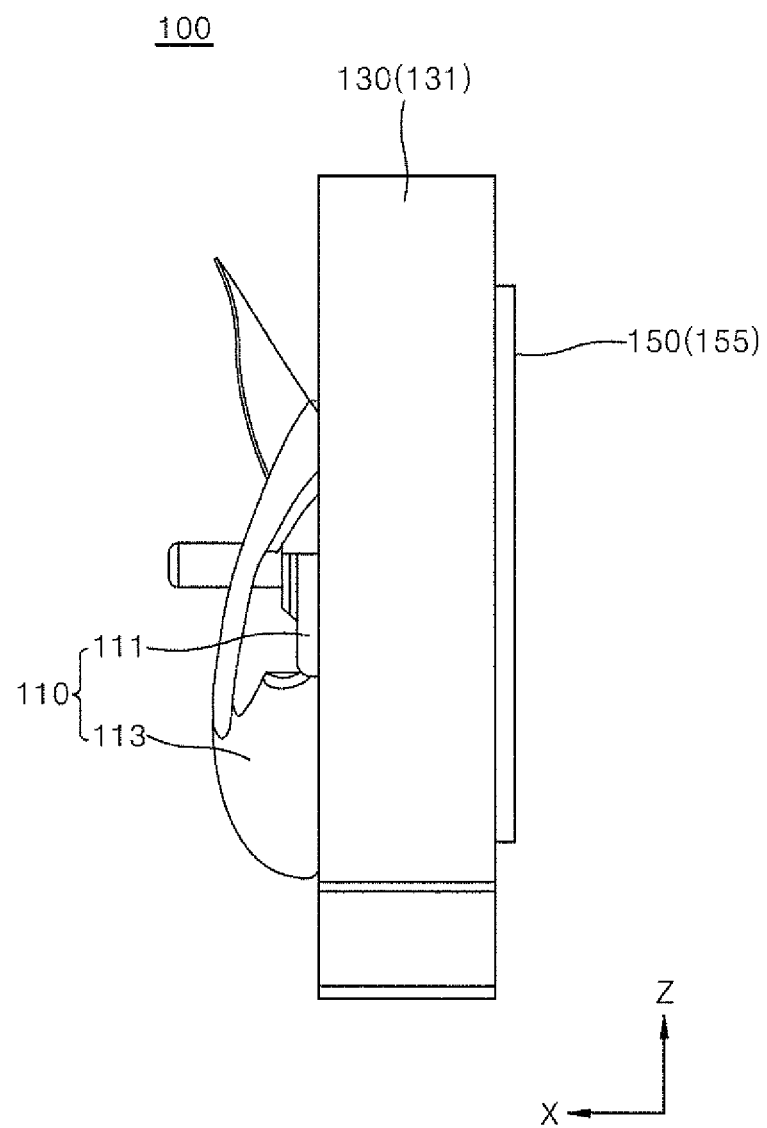
FIG. 3 is a simplified side view of a fan assembly according to an embodiment.
Figure 4:
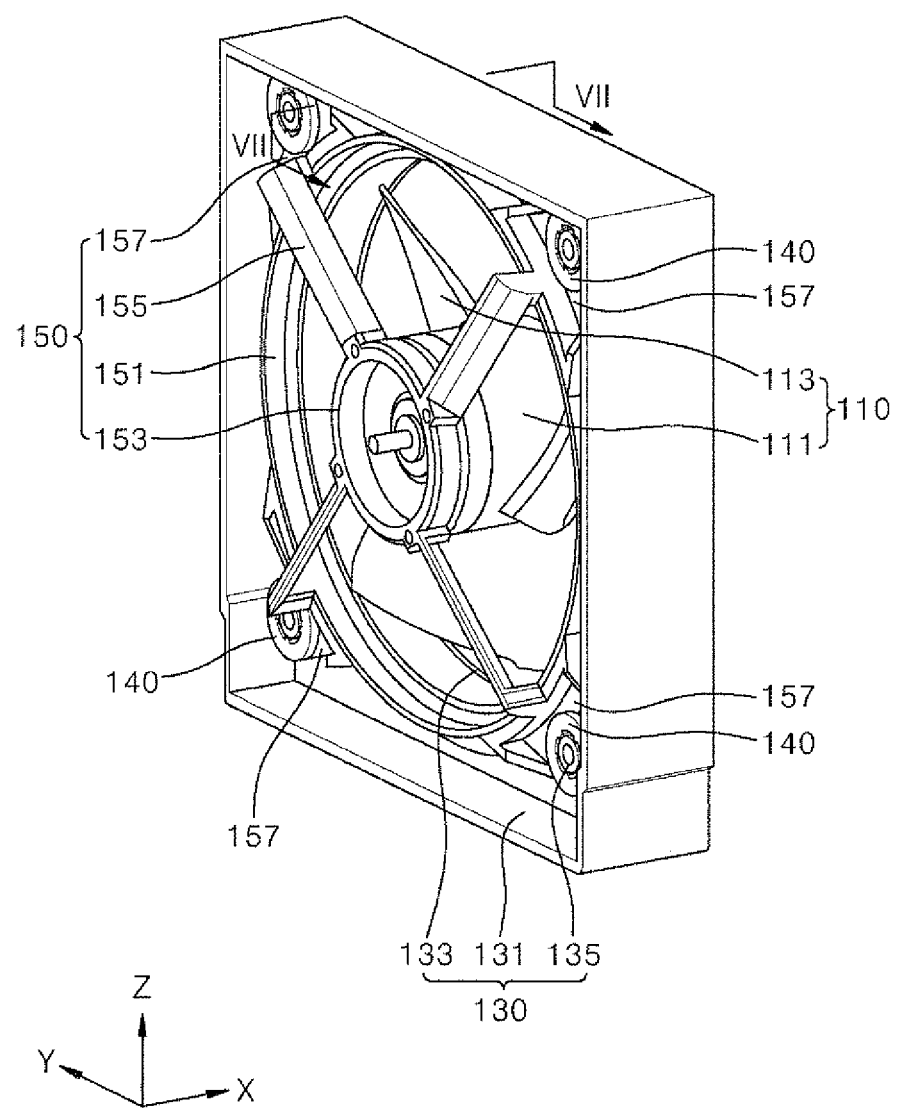
FIG. 4 is a simplified perspective view of a fan assembly according to an embodiment.
Figure 5:
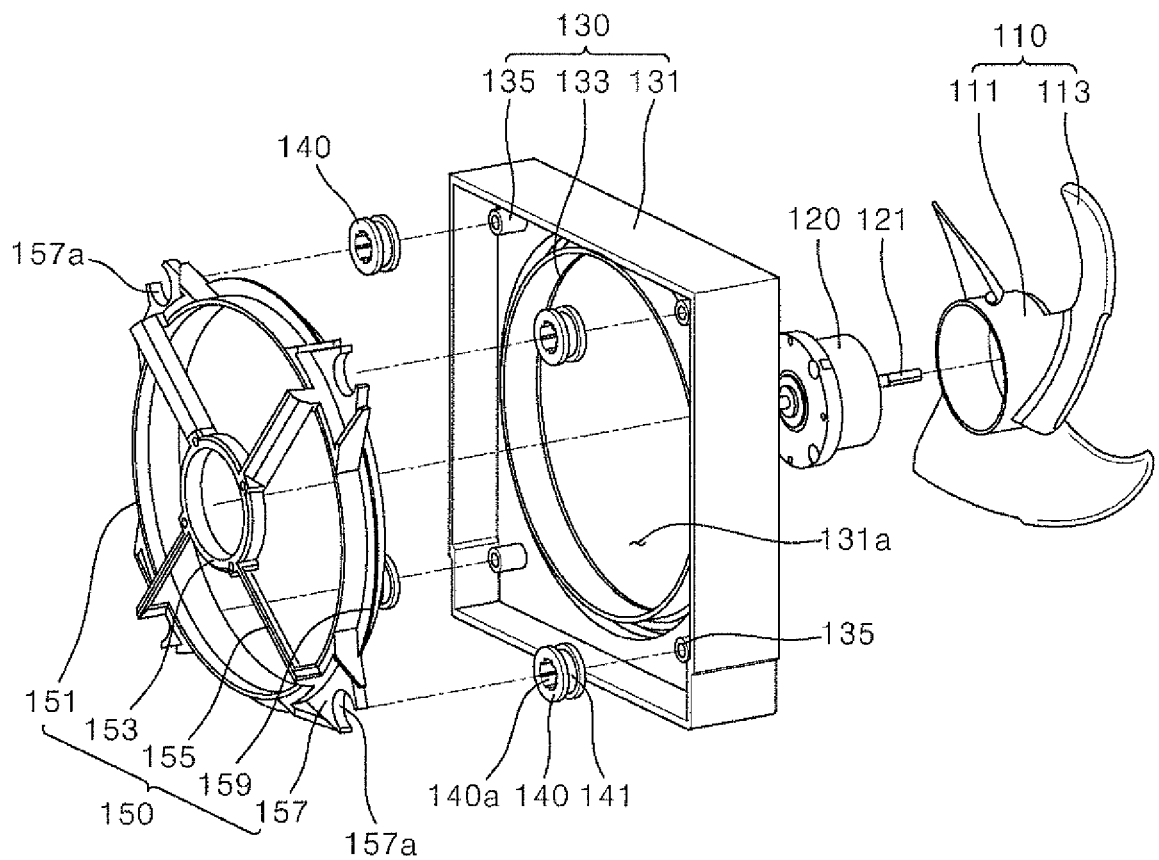
FIG. 5 is an exploded perspective view of a fan assembly according to an embodiment.
Figure 6:
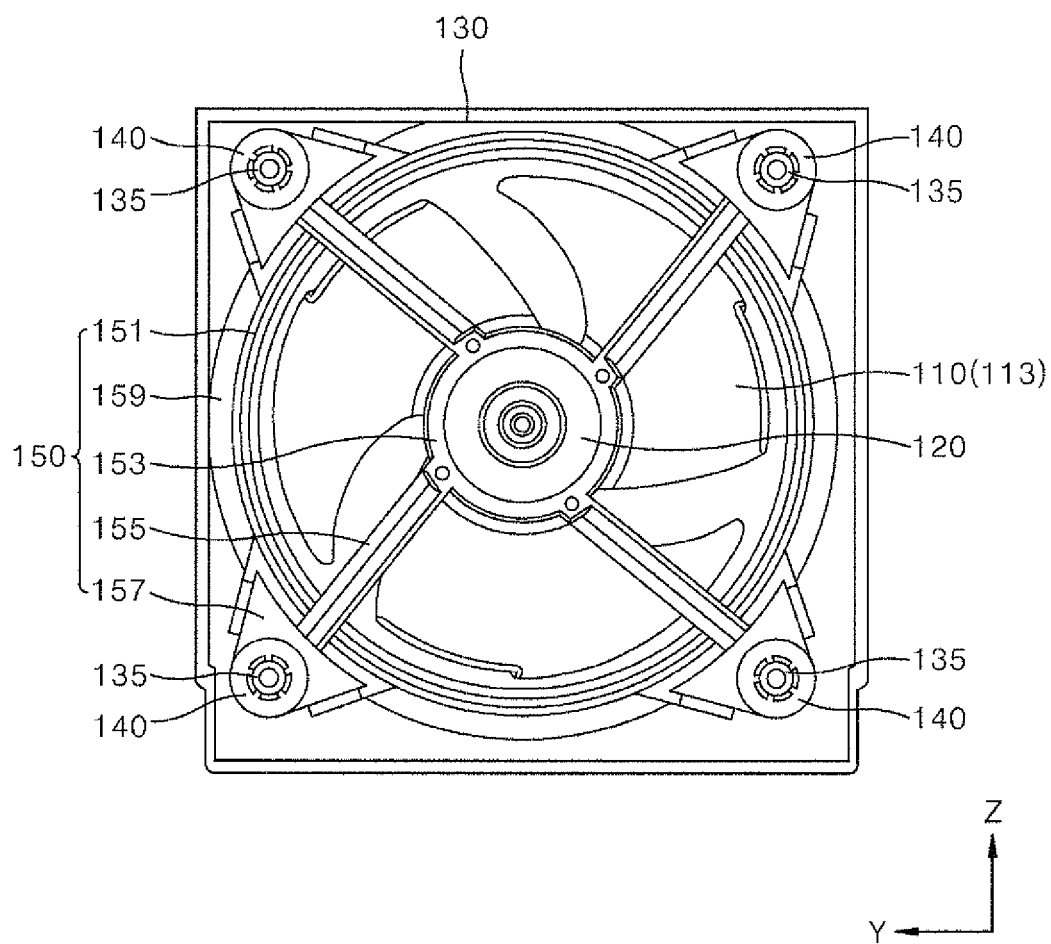
FIG. 6 is a rear view of a fan assembly according to an embodiment.

FIG. 2 is a front view of a fan assembly according to an embodiment. FIG. 3 is a simplified side view of a fan assembly according to an embodiment. FIG. 4 is a simplified perspective view of a fan assembly according to an embodiment. FIG. 5 is an exploded perspective view of a fan assembly according to an embodiment. FIG. 6 is a rear view of a fan assembly according to an embodiment.

The fan assembly 100 according to an embodiment may include a fan 110, a motor 120, an outer housing or housing 130, anti-vibration members 140, and a support frame, frame, or support 150. The fan 110 may include a hub 111 and a plurality of blades 113.

The hub 111 may be provided at a center of the fan 110 and may have a cylindrical shape. However, embodiments disclosed herein are not limited thereto. The shape of the hub 111 may have a cone shape, etc. The plurality of blades 113 may be connected to the hub 111 at predetermined intervals along the circumference of the hub 111.

The fan 110 may be provided by molding the hub 111 and the plurality of blades 113 into an integral structure using a material such as plastic. As an example, the hub 111 of the fan 110 may be cylindrical and may have a closed front face and an open rear face, and the plurality of blades 113 may include three blades radially projected from an outer circumferential face or an outer face of the hub 111, The motor 120 may be connected to and provided in the hub 111 to generate a rotational force or torque that rotates the hub 111. As an example, the motor 120 may be provided in the hub 111, which may be cylindrical and may have an open back face. A rotation shaft 121 of the motor 120 may be inserted into the hub 111 at a center thereof. As the rotation shaft 121 of the motor 120 rotates, the hub 111 and the plurality of blades 113 may also rotate. As another example, the motor 120 may include a housing or rotor that is fitted into and/or fixed to the hub, and the housing may rotate the hub and the plurality of blades.

The housing 130 may have an inner space or accommodation space 131a where the fan 110 may be accommodated. The housing 130 may define or constitute an overall appearance of the fan assembly 100. As an example, the housing 130 may include a rectangular body or housing body 131, an annular guide or guide 133, and bosses 135.

The housing body 131 may form an entire frame of the housing 130. The accommodation space 131a may be defined in the housing body 131 and may be cylindrical. The fan 110 may be accommodated and rotated in the accommodation space 131a. The accommodation space 131a may have a diameter larger than the entire diameter of the fan 110 so that rotation of the fan is smooth.

In an embodiment, this housing body 131 may be a box with an open rear face. The frame 150 may be mounted to the inside of the housing body 131 through the open rear face. As an example, a circular body or frame body 151 forming an outline of the frame 150 may be inserted in the accommodation space 131a in the housing body 131. The frame body 151 may extend along an outer circumference face of the guide 133.

The guide 133 may extend in a circular manner within the accommodation space 131a defined in the housing body 131. The guide 133 may guide a flow of the air or fan air. The guide 133 may define the accommodation space 131a. For example, the guide 133 may have a rounded cross-section. The guide 133 may protrude in a direction of the fan air flow.

In an embodiment, a boss 135 may be provided at each inner corner of the housing body 131. The bosses 135 may be fixed and arranged along the circumference of the frame body 151 and may be coupled respectively to the anti-vibration members 140, which may connect the frame body 151 and the housing 130.

The frame 150 may be mounted through the open rear face of the housing body 131 of the housing 130. The frame 150 may fix the motor 120. The frame 150 may include the frame body 151, a bracket 153, and spokes 155. The frame body 151 may extend along an inner edge of the housing body 131 of the housing 130. An inner space 151a defined in the frame body 151 may have the same size as that of the accommodation space 131a of the housing body 131. The bracket 153 may be located at a center of the inner space 151a of the frame body 151 and may fix the motor 120.

For example, the bracket 153 may fix a rear end or base of the motor 120. When the rear end of the motor 120 has a circular shape, the bracket 153 may have an annular shape corresponding to the shape of the rear end of the motor 120. The rear end of the motor may include notches or ribs that fit into grooves of the bracket, or may be friction fitted into the bracket, for example. The rear end of the motor may also adhere to the bracket via a resin or glue, for example.

The spokes 155 may support the frame body 151 and the bracket 153 by connecting the frame body 151 and the bracket 153. As an example, a plurality of spokes 155 may be provided. The spokes 155 may extend in a radial direction to connect and support the frame body 151, which may have a relatively large diameter, and the bracket 153, which may be provided at a center of the frame body 151. The number of the spokes 155 may be four as shown, but may be not limited thereto.

Figure 7:
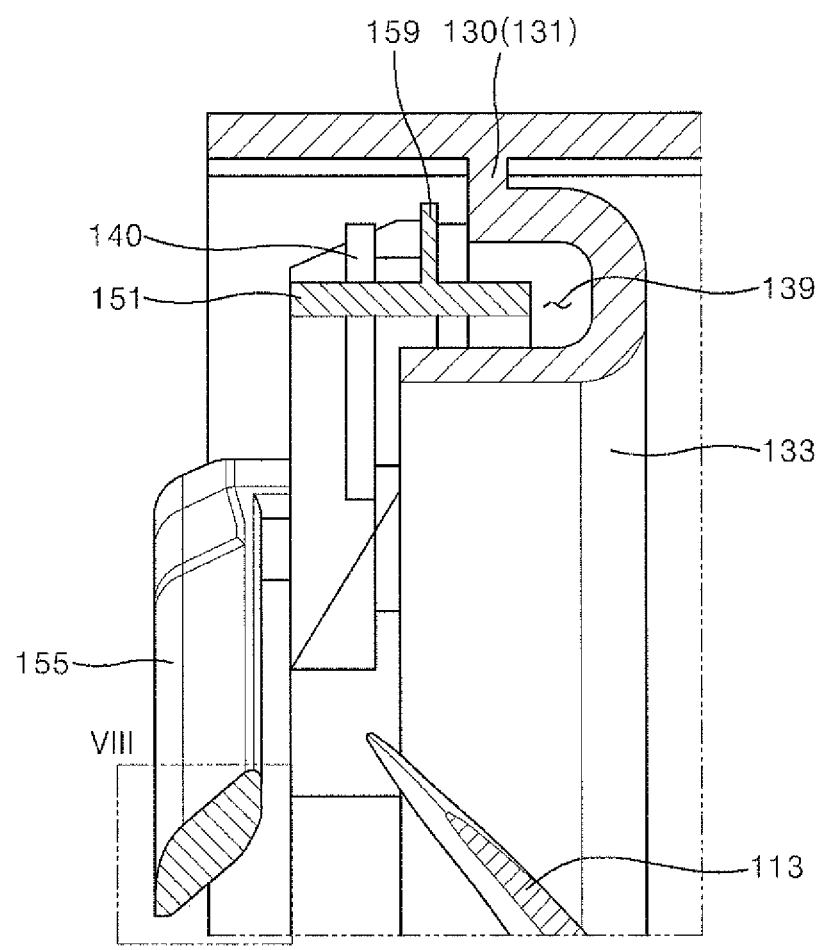
FIG. 7 is an enlarged cross-section view of the "VII-VII" cross-section region of FIG. 4.
Figure 8:
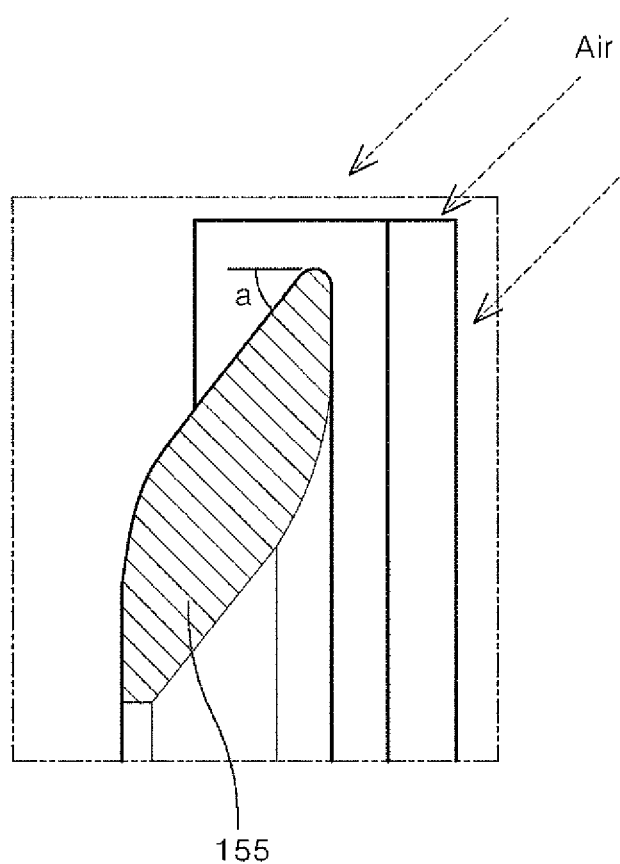
FIG. 8 is an enlarged view of the "VIII" region of FIG. 7, showing that a spoke according to an embodiment is configured to be inclined parallel to a fan air flow direction.

In an embodiment, each of the spokes 155 may be oriented or inclined parallel to the direction of the fan air flow from the fan 110. This exemplary configuration is shown in FIG. 7 and FIG. 8. A plurality of fixing portions or fixing members 157 may be arranged along a periphery of the frame body 151. The fixing members 157 may respectively fix the anti-vibration members. The fixing members 157 may protrude outwardly from the periphery of the frame body 151 and may be spaced along the perimeter thereof.

Each fixing member of the plurality of fixing members 157 may include a fixing groove or groove 157a that accommodates an anti-vibration member 140. Each of the grooves 157a may have an arc shape wherein one outer side is open. Each of the anti-vibration members 140 may be fixed and inserted respectively into each of the grooves 157a.

The anti-vibration members 140 may connect the frame 150 or the frame body 151 to the housing 130. The anti-vibration members 140 may suppress a vibration generated between the frame 150 or the frame body 151 and the housing 130. The anti-vibration members 140 may be fixedly arranged along the periphery of the frame body 151. The anti-vibration members 140 may be fixed by the bosses 135 provided on the housing body 131 of the housing 130. The anti-vibration members 140 may be made of an elastic or an elastomer, and may be friction fitted into the grooves 157a, for example. The anti-vibration members may be made of a material that suppresses vibration. The bosses 135 may be friction fitted in the anti-vibration members, for example. However, the anti-vibration members and bosses may also be secured via a resin or glue, for example. Alternatively, the frame 150 may be fixed via a screw inserted into the boss 135 with the screw having an elastomer boss surrounding the screw near the head of the screw.

A center of each anti-vibration member 140 may have a hollow portion or space 140a. Each space 140a may have a size corresponding to a size of the boss 135 such that the boss 135 may be fitted into the space 140a. Each anti-vibration member 140 may include a diameter-reduced portion or recessed groove 141 in and along an outer circumferential face or outer face thereof. The recessed groove 141 may have a relatively reduced outer diameter and may be defined in a circular groove shape. That is, the recessed groove 141 may have a diameter that is less than a maximum outer diameter of the anti-vibration member 140. The recessed groove of the anti-vibration member 140 may engage with each of the grooves 157a provided in the fixing members 157 of the frame 150. Accordingly, the diameter of the recessed grove 141 may have a size corresponding to a size of the corresponding groove 157a.

In an embodiment, the fan assembly 100 may further include a protrusion or flange 159 that prevents a backflow of the air flow from the fan 110. The protrusion 159 may protrude outwardly from an outer peripheral face of the frame body 151. This protrusion may prevent a backflow of air leaving the fan 110, and thereby increase the air-flow rate and reduce noise.

FIG. 6 is a rear view of a fan assembly according to an embodiment. The frame 150 may be mounted through an open rear face of the housing body 131 of the housing 130. The housing body 131 and the frame body 151 of the frame 150 may be connected to each other via the anti-vibration members 140. Each of the anti-vibration members 140 may be inserted and fixed in each of the fixing members 157 provided along the periphery of the frame body 151. Each of the anti-vibration members 140 may be fitted with and fixed to each boss 135 provided at each corner of the housing body 131, which may suppress vibration generated when the fan 110 is driven.

The frame body 151 may be fixed to and provided in an inside of the housing body 131, thus coupling the housing 130 and the frame 150. The motor 120 may be fixed in the bracket 153, which is supported at the center of the frame body 151 via the spokes 155. As a result, when the motor 120 rotates, the fan 110 may smoothly rotate in a stable, supported state in which the air flow is driven. A base of the motor may include notches or ribs that may fit into corresponding grooves provided in the bracket.

When air flows from the fan 110, there may be a backward flow through a joint area between the housing 130 and the frame 150; particularly, between the housing 130 and the frame body 151. This may reduce the air-flow rate and may increase noise. The reduction of the air-flow rate of the fan assembly 100 may reduce heat dissipation, which may increase the power consumption of the refrigerator.

In order to prevent the backflow of the air from the fan, the protrusion 159 may outwardly protrude to a predetermined dimension, or may outwardly protrude a predetermined amount, from the circumferential face of the frame body 151 and may extend in a circular shape.

FIG. 7 is an enlarged cross-section view of the "VII-VII" cross-section region of FIG. 4. The housing 130, including the housing body 131 and the guide 133, and the frame body 151 may be connected via the anti-vibration members 140. Air leaving the blades 113 may flow into a coupling region or space between the housing 130 and the frame body 151, resulting in the backflow of air from the fan.

According to an embodiment, an air channel 139 may be defined between the housing 130 and the frame body 151, which are connected via the anti-vibration members 140. The air channel 139 may be U-shaped. Further, the protrusion 159 may block an air outlet of the air channel 139. The air channel 139 may have a shape that prevents air from easily escaping through the coupling region between the housing 130 and the frame body 151. Embodiments disclosed herein are not necessarily limited to the illustrated shape of the air channel 139. The backflow of the air may be further suppressed when the protrusion 159 has a structure that blocks the air channel 139.

Thus, the air channel 139 and protrusion 159 may structurally prevent the backflow of air between the housing 130 and the frame body 151. As an example, the protrusion 159 may include a plate member or a plate having a predetermined thickness that protrudes from the outer circumferential face or outer face of the frame body 151 by a predetermined radial thickness.

For example, when each of the anti-vibration members 140 is ring-shaped, the protrusion 159 may include a plate protruding toward a center of the ring-shaped anti-vibration member 140, that is, in a radial direction of the member 140. The protrusion 159 may protrude at a right angle from the outer circumferential face of the frame body 151. However, embodiments disclosed herein are not limited thereto. In another example, the protrusion 159 may protrude at an acute or obtuse angle from the outer circumferential face of the frame body 151, or may protrude or extend in a direction different than a direction in which the outer circumferential face of the frame body 151 extends.

The protrusion dimension of the protrusion 159 may be constant along the circumference, However, embodiments disclosed herein are not limited thereto, and the protrusion 159 may have a multi-stepped extension shape, for example.

FIG. 8 is an enlarged view of the "VIII" region of FIG. 7, showing that a spoke according to embodiments disclosed herein may be configured to be inclined parallel to an air flow direction. The spokes 155 may connect and support the frame body 151 and the bracket 153. A main plane of a set of conventional spokes has an orientation such that each spoke directly collides with air flow leaving the fan. For example, the orientation of the main plane may be perpendicular to a rotation plane of a conventional fan, which may increase a flow resistance or a resistance to the air flow from the fan. This configuration may also decrease an air-flow rate of the fan assembly and increase noise.

To solve this problem, a main plane of the spokes 155 in the fan assembly 100 according to an embodiment disclosed herein may be oriented or inclined parallel to the direction of the air flow leaving the fan, as shown in FIG. 8. As a result, the spoke may avoid or reduce collision with the air leaving the fan. Thus, embodiments disclosed herein may result in a flow resistance that is less than the flow resistance resulting from the conventional orientation of the spoke 155, and may also have increased air-flow rate and reduced noise. That is, the inclined orientation of the spokes 155 of embodiments disclosed herein may result in a fan assembly 100 that has less flow resistance, more air-flow, and less noise than a conventional fan assembly having a conventional orientation of spokes.

As an example, a main plane of each of the spokes 155 may be oriented to have an inclination angle a (see FIG. 8) corresponding to an outlet flow angle of the blades 113 (see FIG. 4). The 'outlet flow angle' of the blades refers to an angle at which the air leaving the blades flows. That is, with reference to a rotating face of the fan, the outlet flow angle of the blades may be equal to the inclination angle a of the spokes 155. The inclination angle a of the spokes 155 may be set in or have a predetermined value in the range of 38.5 degrees to 39.5 degrees. The outlet flow angle of the blades may therefore also be set in or have a predetermined value in the range of 38.5 to 39.5 degrees.

Figure 9:
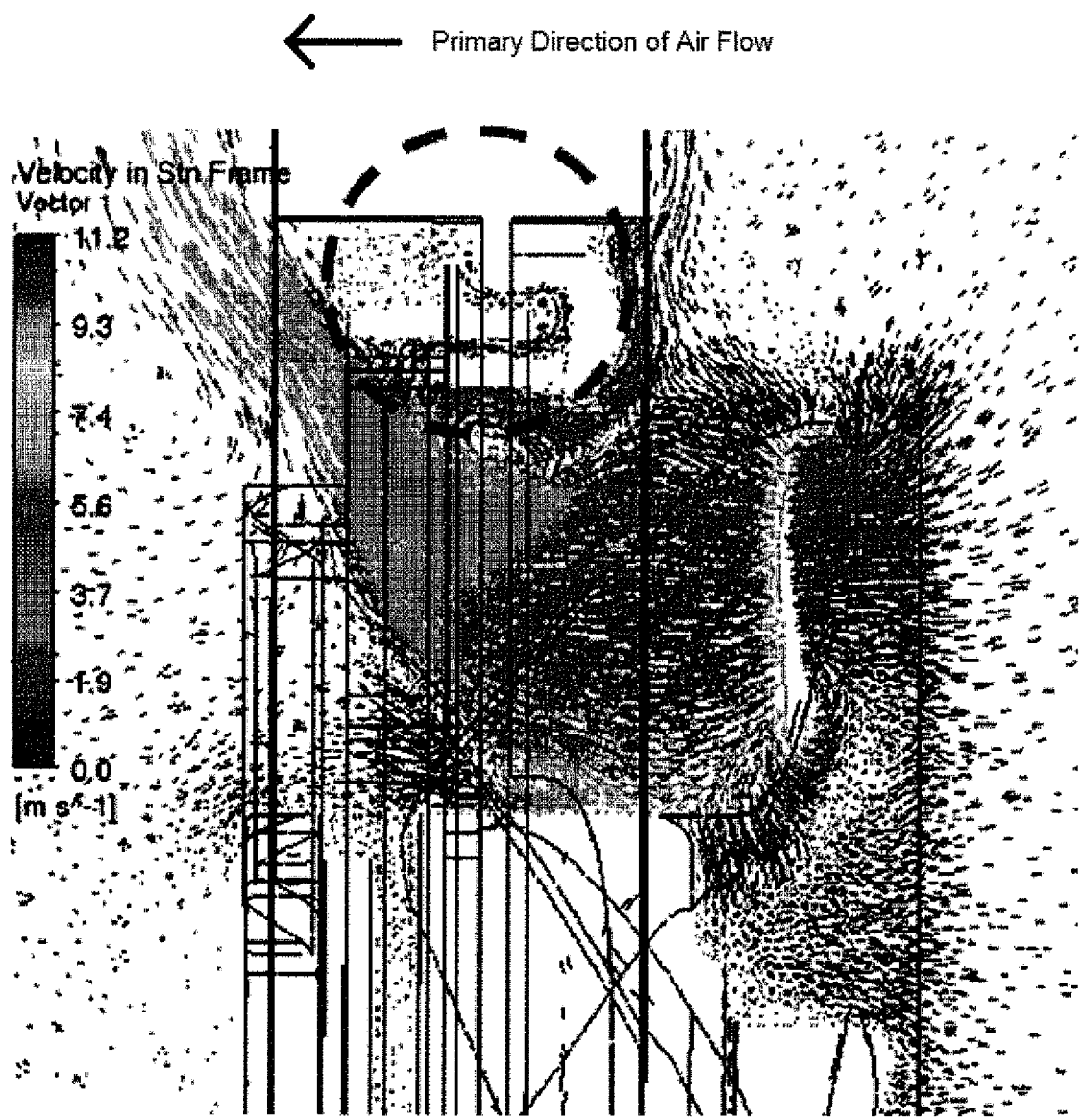
FIG. 9 is a computational fluid dynamic (CFD) image showing an effect of preventing backflow using a fan assembly according to an embodiment.
Figure 10:
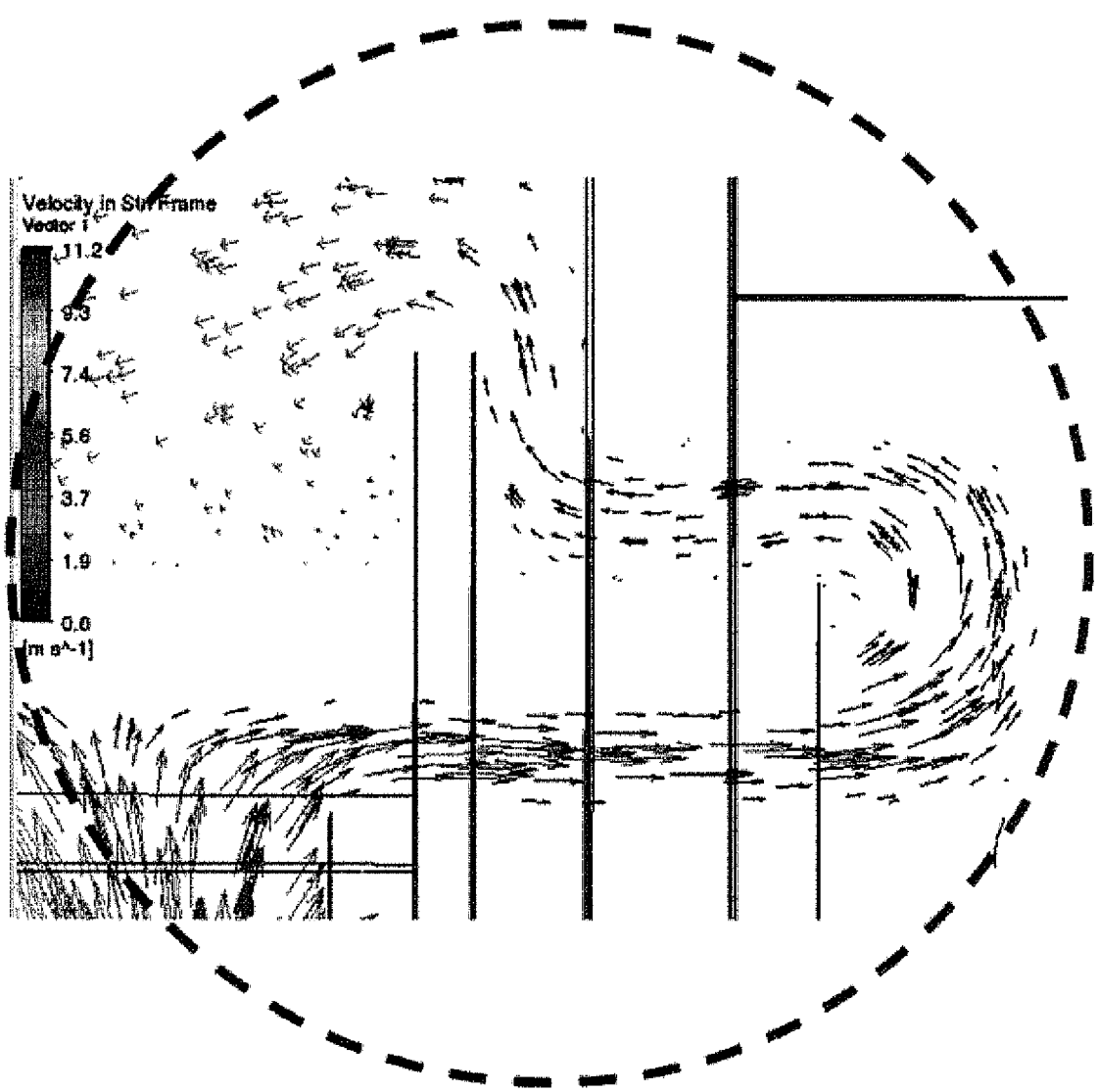
FIG. 10 is a CFD image exaggerating an effect of preventing backflow using a protrusion of a fan assembly according to an embodiment, or an image enlarging the effect shown in FIG. 9.

FIG. 9 is a computational fluid dynamic (CFD) image showing an effect of preventing backflow using a fan assembly according to an embodiment. FIG. 10 is a CFD image exaggerating an effect of preventing backflow using a protrusion of a fan assembly according to an embodiment, or enlarging the effect shown in FIG. 9. FIGS. 9 and 10 may confirm that the backflow of the air leaving the fan is prevented by the protrusion having a structure that blocks a narrow channel defined between the housing and the frame.

Figure 11:
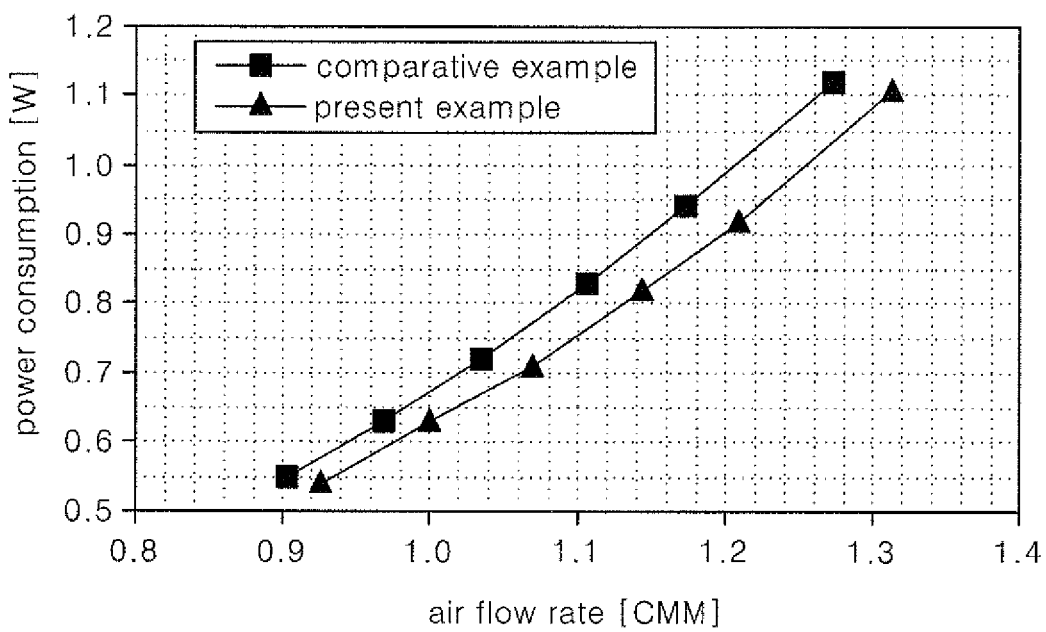
FIG. 11 is a graph showing a relationship between power consumption and air-flow rate of a fan assembly according to an embodiment, and of a comparative example according to related art.

FIG. 11 is a graph showing a relationship between power consumption and air-flow rate of a fan assembly according to an embodiment and also of a comparative example according to the related art. FIG. 11 may confirm that the fan assembly according to an embodiment disclosed herein has a lower power consumption versus the air-flow rate as compared to a comparative example according to the related art, which is free of the protrusion, and in which the spokes do not have the above-mentioned inclination angle.

Figure 12:
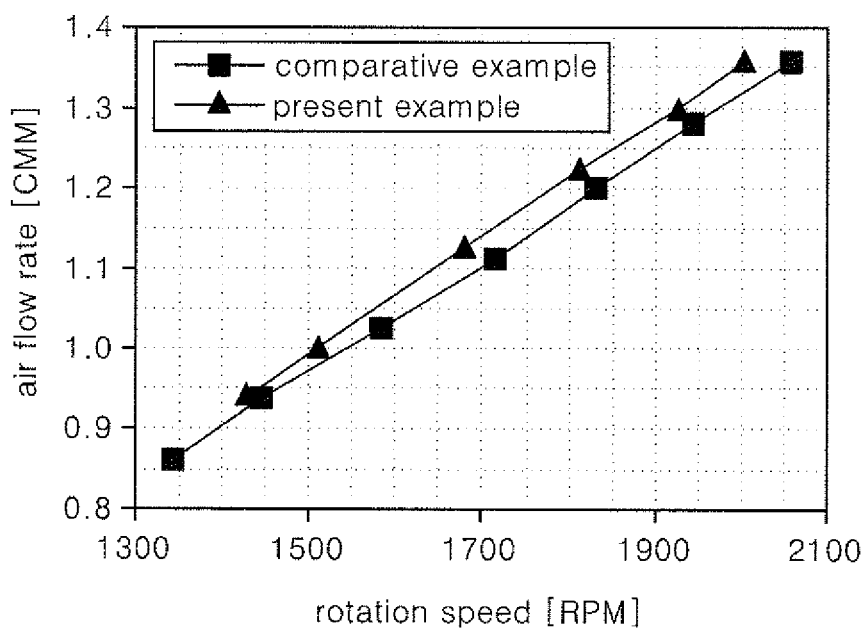
FIG. 12 is a graph showing a relationship between air-flow rate and rotation speed of a fan assembly according to an embodiment, and of a comparative example according to related art.

FIG. 12 is a graph showing a relationship between air-flow rate and rotation speed for a fan assembly according to an embodiment disclosed herein, and also of a comparative example according to the related art. Referring to FIG. 12, the air-flow rate in the fan assembly according to an embodiment disclosed herein may be greater as compared to the comparative example according to the related art, which is free of the protrusion, and in which the spokes do not have the above-mentioned inclination angle.

Figure 13:
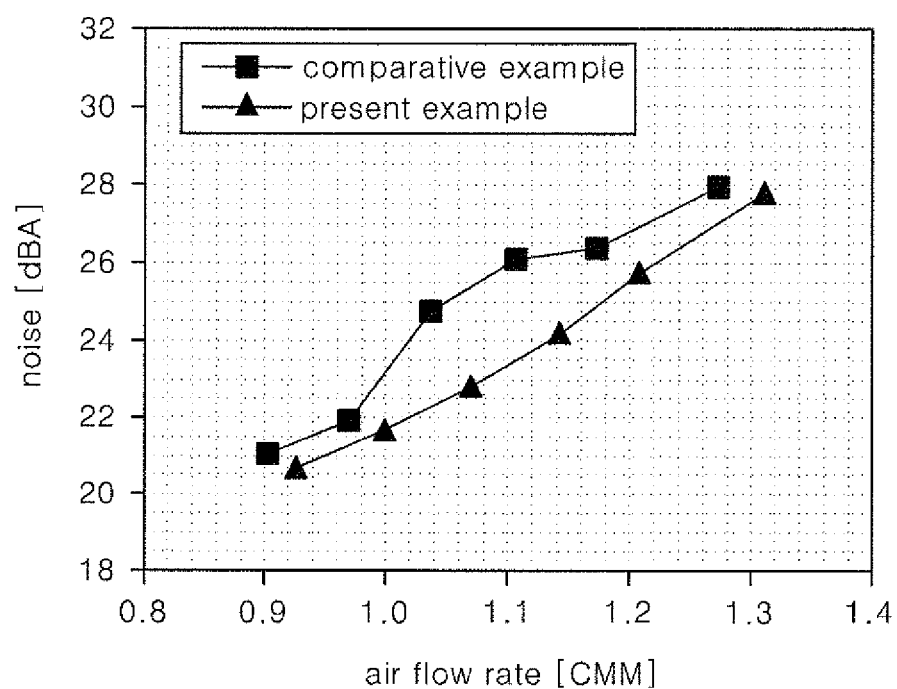
FIG. 13 is a graph showing a relationship between noise and air-flow rate of a fan assembly according to an embodiment, and of a comparative example according to related art.

FIG. 13 is a graph showing a relationship between noise and air-flow rate of a fan assembly according to an embodiment disclosed herein, and also of a comparative example according to the related art. Referring to FIG. 13, noise may be reduced in a fan assembly according to an embodiment disclosed herein as compared to the comparative example according to the related art, which is free of the protrusion, and in which the spokes do not have the above-mentioned inclination angle.

According to the configuration and operation of embodiments disclosed herein, the fan-air backflow may be structurally blocked by the protrusion. Further, by aligning the spokes at an angle parallel to the direction of the fan outlet flow, the collision between the fan outlet flow and the spokes may be reduced.

As a result, the fan assembly according to embodiments disclosed herein may have an advantage in that the air-flow rate relative to a rotation speed of the fan is increased, and the noise is reduced. Accordingly, a refrigerator including the fan assembly according to embodiments disclosed herein may have the advantageous technical effect of reducing power consumption.

Embodiments disclosed herein may provide a fan assembly capable of preventing backward fan-air flow and, further, of suppressing collision between fan outlet air flow and spokes. Embodiments disclosed herein may further provide a refrigerator including a fan assembly capable of preventing backward fan-air flow and, further, of suppressing collision between fan outlet air flow and spokes.

Embodiments disclosed herein are not limited to the above-mentioned purposes. Other purposes and advantages of the present disclosure, as not mentioned above, may be understood from the following descriptions and more clearly understood from the embodiments disclosed herein. Further, it will be readily appreciated that the objects and advantages of embodiments disclosed herein may be realized by features and combinations thereof as disclosed in the claims.

Embodiments disclosed herein may provide a fan assembly comprising a fan including a hub and blades arranged around and fixed to the hub; a motor provided in and connected to the hub to rotate the hub; an outer housing or housing having an accommodation space or inner space defined therein that accommodates the fan therein; a support frame or frame including an annular body or frame body provided in and coupled to the outer housing, a bracket centrally positioned in the annular body that fixes the motor, and spokes extending between and coupled to the annular body and the bracket; anti-vibration members arranged along and fixed to the annular body, wherein the anti-vibration members connect the annular body to the outer housing; and a protrusion protruding outwardly from and along an outer circumferential face or outer face of the annular body to prevent backflow of fan-air from the fan.

In an embodiment, a U-shaped air channel or air channel may be defined between the outer frame and the annular body connected via the anti-vibration members. The protrusion may block an outlet of the U-shaped air channel. The protrusion may include a plate protruding from the outer circumferential face of the annular body by a predetermined dimension. Each of the anti-vibration members may have a ring shape, wherein the protrusion protrudes in a radial direction of the ring-shaped anti-vibration member. The protrusion may have a protrusion dimension varying along the outer circumferential face of the annular body.

Each of the spokes may be oriented obliquely to be parallel to a direction of an air flow from the fan. Each of the spokes may have an inclination angle corresponding to an outlet flow angle of the blades. Each of the spokes may have an inclination angle in a range of 38.5 to 39.5 degrees.

The outer housing may include a rectangular body or housing body having a circular accommodation space defined therein that accommodates the fan therein, wherein the annular body may be provided along and coupled to an inner edge of the rectangular body; an annular guide or guide extending around the circular accommodation space and coupled to the rectangular body, wherein the annular guide may be constructed to guide fan-air flow; and bosses fixedly provided at inner corners of the rectangular body respectively, wherein the bosses may be coupled to the anti-vibration members respectively.

The support frame may further include a plurality of fixing portions or fixing members protruding outwardly from an outer circumferential face or outer face of the annular body, wherein the fixing portions may be spaced apart from each other along the outer circumferential face, and wherein each of the fixing portions may have an arc-shaped fixing groove or groove that fixes each anti-vibration member therein. Each of the anti-vibration members may have an outer circumferential diameter-reduced portion or recessed groove, wherein each diameter-reduced portion may be fixedly fitted into each arc-shaped fixing-groove.

Embodiments disclosed herein may provide a refrigerator comprising a refrigerator body or body with at least one cooling chamber defined therein; a cooling cycle system, a refrigeration cycle system, or a refrigeration cycle including a compressor and a condenser provided in a machine compartment in the refrigerator body, wherein the cooling cycle system may be configured to supply cool air to the cooling chamber; and a fan assembly that may forcedly flow air to promote cooling by the cooling cycle system, wherein the fan assembly comprises a fan including a hub and blades arranged around and fixed to the hub; a motor provided in and connected to the hub to rotate the hub; an outer housing or housing having an accommodation space or inner space defined therein that accommodates the fan therein; a support frame or frame including an annular body or frame body provided in and coupled to the outer housing, a bracket centrally positioned in the annular body that fixes the motor, and spokes extending between and coupled to the annular body and the bracket; anti-vibration members arranged along and fixed to the annular body, wherein the anti-vibration members connect the annular body to the outer housing; and a protrusion protruding outwardly from and along an outer circumferential face of the annular body to prevent backflow of fan-air from the fan.

The fan assembly may be provided within the machine compartment and may be spaced apart from a position where the compressor and the condenser are provided, wherein the fan assembly may be positioned above a defrosted water tray.

The fan assembly may prevent fan air flow backflow. Further, the collision between a fan outlet flow and the spokes may be suppressed by orienting the spokes obliquely so as to be parallel to the direction of the fan outlet flow. This orientation reduces the noise while increasing the air-flow rate by the fan assembly. The refrigerator including the fan assembly may have decreased power consumption due to an increased air-flow rate and noise reduction from the fan assembly.

Specific effects of embodiments disclosed herein as well as the effects as described above will be described together with specific examples for carrying out the invention. In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fan assembly, including:
    a fan including a hub and a plurality of blades coupled to the hub;
    a motor connected to the hub;
    a housing having a space defined therein that accommodates the fan therein;
    a frame including:
        a frame body provided in and coupled to the housing,
        a bracket centrally positioned in the frame body that fixes the motor, and
        a plurality of spokes extending between and coupled to the frame body and the bracket;

a plurality of anti-vibration members arranged along and fixed to the frame body, wherein the anti-vibration members connect the frame body to the housing; and a protrusion protruding from and along a first surface of the frame body to prevent a backflow of air from the fan, wherein each of the spokes in the plurality of spokes has an inclination angle corresponding to an outlet flow angle of air leaving the blades.

2. The fan assembly of claim 1, wherein an air channel is defined between the housing and the frame body.

3. The fan assembly of claim 2, wherein the protrusion blocks an outlet of the air channel.

4. The fan assembly of claim 1, wherein the protrusion includes a plate protruding from the first surface of the frame body by a predetermined dimension.

5. The fan assembly of claim 1, wherein each of the anti-vibration members of the plurality of anti-vibration members has a ring shape, and wherein the protrusion protrudes in a radial direction of the plurality of ring-shaped anti-vibration members.

6. The fan assembly of claim 1, wherein the protrusion has a protrusion dimension varying along the first surface of the frame body.

7. The fan assembly of claim 1, wherein each of the spokes in the plurality of spokes is oriented parallel to a direction of a flow of air from the fan.

8. The fan assembly of claim 1, wherein the housing includes:

a housing body having the space defined therein, wherein the space is circular and wherein the frame body is provided along and coupled to an inner edge of the housing body;

a guide extending around the circular space and coupled to the housing body to guide a flow of air from the fan; and a plurality of bosses respectively fixed at inner corners of the housing body, wherein the bosses in the plurality of bosses are respectively coupled to the anti-vibration members.

9. The fan assembly of claim 1, wherein the frame further includes a plurality of fixing members protruding from the first surface of the frame body and spaced apart from each other along the first surface, wherein each of the fixing members of the plurality of fixing members has an arc-shaped groove that fixes each anti-vibration member therein.

10. The fan assembly of claim 1, wherein each of the anti-vibration members has a recessed groove that is fixed and fitted into each arc-shaped groove.

11. A refrigerator including:

a body having at least one cooling chamber;

a refrigeration cycle including a compressor and a condenser provided in a machine compartment in the body, wherein the refrigeration cycle supplies cool air to the cooling chamber; and a fan assembly that forces a flow of air to promote cooling and heat dissipation by the refrigeration cycle, wherein the fan assembly includes:

a fan including a hub and a plurality of blades coupled to the hub;

a motor coupled to the hub to rotate the hub;

a housing having a space defined therein that accommodates the fan;

a support including:

a body of the support provided in and coupled to the housing, a bracket centrally positioned in the body of the support that fixes the motor, and a plurality of spokes extending between and coupled to the body of the support and the bracket;

a plurality of anti-vibration members arranged along and fixed to the body of the support, wherein the anti-vibration members connect the body of the support to the housing; and a protrusion protruding from and along an outer circumferential face of the body of the support to prevent a backflow of air from the fan, wherein each of the spokes in the plurality of spokes has an inclination angle corresponding to an outlet flow angle of air leaving the blades.

12. The refrigerator of claim 11, wherein the fan assembly is provided within the machine compartment and is spaced apart from a position where the compressor and the condenser are provided, wherein the fan assembly is positioned above a defrosted water tray.

13. The refrigerator of claim 11, wherein each of the spokes in the plurality of spokes is angled parallel to a direction of a flow of air from the fan such that the air flow collides with a face of each of the spokes having a minimum surface area.

14. A fan assembly, including: a fan having a hub and a plurality of blades coupled to the hub; a circular frame including: a. first ring having a first diameter, a plurality of spokes extending radially outward from the first ring, wherein first ends of the plurality of spokes are coupled to the first ring, a second ring having a second diameter greater than the first diameter, wherein second ends of the spokes are coupled to the second ring; a housing provided between the fan and the circular frame; a motor configured to rotate the plurality of blades, wherein the motor includes a base and a housing, the base being fixed to the first ring and the housing of the motor being provided in the hub of the fan, wherein the blades have a predetermined blade pitch or blade angle relative to the hub that corresponds to an angle at which air leaving the blades flows relative to the frame when the fan is rotated, and wherein the spokes are inclined planes having an inclination angle relative to a radial plane of the frame that is equal to the angle at which the air leaving the blades flow; and a flange extending radially outward from the second ring of the frame, wherein the flange extends a predetermined amount away from the frame, and is oriented such that a backflow of air contacts a maximum surface area of the flange so that the backflow of air is blocked from flowing back to the fan.

15. The fan assembly of claim 14, wherein the motor further includes a shaft that is inserted into the hub and rotates the hub.

16. The fan assembly of claim 14, further including at least one anti-vibration member configured to absorb vibrations from the rotating blades and having a recessed groove.

17. The fan assembly of claim 14, wherein the spokes are oriented such that air flowing from the fan contacts a minimum surface area of the spokes.

18. The fan assembly of claim 14, wherein the spokes have an inclined plane shape or curved ramp shape such that the second end of the spokes has a first surface that is connected to the frame, a second surface that extends away from the frame, and a third surface that is connected to the first surface and the second surface.

* * * * *